(12) United States Patent
Yang

(10) Patent No.: US 10,671,599 B2
(45) Date of Patent: Jun. 2, 2020

(54) CONSENSUS SYSTEM AND METHOD

(71) Applicant: ALIBABA GROUP HOLDING LIMITED, Grand Cayman (KY)

(72) Inventor: Dayi Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/716,932

(22) Filed: Dec. 17, 2019

(65) Prior Publication Data
US 2020/0125556 A1 Apr. 23, 2020

Related U.S. Application Data

(63) Continuation of application No. PCT/CN2019/090101, filed on Jun. 5, 2019.

(51) Int. Cl.
*G06F 17/30* (2006.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC .............................. G06F 16/2379; G06F 16/27
See application file for complete search history.

(56) References Cited

U.S. PATENT DOCUMENTS 10,049,017 B2 8/2018 Karame et al.
10,084,826 B1 9/2018 Irwan et al.
10,491,608 B1 * 11/2019 Tatge ............... H04L 9/0897
(Continued)

FOREIGN PATENT DOCUMENTS

CN 107391320 A 11/2017
CN 109246122 A 1/2019
(Continued)

OTHER PUBLICATIONS

Irwin Daniel, Storing and exploring the Bitcoin blockchain, Dec. 12, 2009, Kx Systems, Inc, https://code.kx.com/q/wp/blockchain/ (Year: 2009).*

(Continued)

*Primary Examiner* — Jeff A Burke
*Assistant Examiner* — Fernando M. Mari Valcarcel
(74) *Attorney, Agent, or Firm* — Sheppard Mullin Richter & Hampton LLP

(57) ABSTRACT

Consensus methods, systems, and apparatus, including computer programs encoded on computer storage media, are provided. One of the methods is to be implemented on a blockchain maintained by a number (N) of nodes. One of the nodes acts as a primary node and the other (N−1) nodes act as backup nodes. The method includes: detecting a change in a current height H of the blockchain; determining the primary node based on a parameter P and the number of nodes N, wherein the parameter P is proportional to the current height H of the blockchain; in response to determining that the one of the N nodes is the primary node, executing a PBFT normal operation protocol as the primary node; and in response to determining that the one of the N nodes is not the primary node, executing the PBFT normal operation protocol as one of the backup nodes.

17 Claims, 8 Drawing Sheets

(56) References Cited

U.S. PATENT DOCUMENTS

| | | | |
|---|---|---|---|
| 2013/0290249 A1* | 10/2013 | Merriman | G06F 16/273 |
| | | | 707/610 |
| 2017/0236120 A1 | 8/2017 | Herlihy et al. | |
| 2018/0101560 A1 | 4/2018 | Christidis et al. | |
| 2018/0113752 A1 | 4/2018 | Derbakova et al. | |
| 2018/0152289 A1 | 5/2018 | Hunt et al. | |
| 2018/0247320 A1 | 8/2018 | Gauld | |
| 2018/0341930 A1 | 11/2018 | Moir et al. | |
| 2019/0012662 A1 | 1/2019 | Krellenstein et al. | |
| 2019/0018984 A1* | 1/2019 | Setty | H04L 63/123 |
| 2019/0036957 A1 | 1/2019 | Smith et al. | |
| 2019/0058709 A1 | 2/2019 | Kempf et al. | |
| 2019/0097790 A1 | 3/2019 | Li et al. | |
| 2019/0116185 A1 | 4/2019 | Nagai et al. | |
| 2019/0163887 A1 | 5/2019 | Frederick et al. | |
| 2019/0164150 A1 | 5/2019 | Lee et al. | |
| 2019/0166133 A1* | 5/2019 | Frederick | H04L 63/061 |
| 2019/0294514 A1 | 9/2019 | Tang | |

FOREIGN PATENT DOCUMENTS

| | | |
|---|---|---|
| WO | 2019072296 A2 | 4/2019 |
| WO | 2019101241 A2 | 5/2019 |

OTHER PUBLICATIONS

Hughes Mark, How Elliptic Curve Cryptography Works, Jun. 26, 2019, All About Circuits, https://www.allaboutcircuits.com/technical-articles/elliptic-curve-cryptography-in-embedded-systems/ (Year: 2019).*

Written Opinion of the International Searching Authority and International Search Report for PCT Application No. PCT/CN2019/090101 dated Feb. 24, 2020 (8 pages).

* cited by examiner

510

```
A blockchain is maintained by a number (N) of nodes, wherein one of
the nodes acts as a primary node and the other (N-1) nodes act as
backup nodes, and the method is performed by one of the N nodes
```

511: detecting a change in a current height H of the blockchain

512: determining the primary node based on a parameter P and the number of nodes N, wherein the parameter P is proportional to the current height H of the blockchain 513: in response to determining that the one of the N nodes is the primary node, executing a PBFT normal operation protocol as the primary node 514: in response to determining that the one of the N nodes is not the primary node, executing the PBFT normal operation protocol as one of the backup nodes 515: repeating the steps 511-514 for one or more rounds of the execution of the PBFT normal operation protocol; and for each of the one or more rounds, changing the primary node based on the parameter P and the number of nodes

FIG. 5

CONSENSUS SYSTEM AND METHOD

CROSS REFERENCE TO RELATED APPLICATION

The present application is a continuation application of International Patent Application No. PCT/CN2019/090101, filed on Jun. 5, 2019, and entitled "CONSENSUS SYSTEM AND METHOD", the entire contents of which are incorporated herein by reference.

TECHNICAL FIELD

This application generally relates to methods and devices for a consensus system and method, and in particular, to a consensus system and method for changing primary node.

BACKGROUND

Practical Byzantine Fault Tolerance (PBFT) is a type of consensus mechanism that can be implemented in distributed systems such as blockchain systems. PBFT consensus mechanism enables a distributed system to reach a sufficient consensus with safety and liveness, despite that certain nodes of the system may fail (e.g., due to poor network connection or otherwise becomes faulty) or propagate incorrect information to other peers (e.g., acting maliciously). The objective of such mechanism is to defend against catastrophic system failures by mitigating the influence of the non-functioning nodes on the correct function of the system and on the consensus reached by the functioning nodes (e.g., non-faulty and honest nodes) in the system.

The PBFT consensus mechanism focuses on providing a practical Byzantine state machine replication that tolerates Byzantine faults (e.g., non-functioning nodes) through an assumption that there are independent node failures and manipulated messages propagated by specific and independent nodes. In this PBFT consensus mechanism, for example, all nodes in a blockchain system are ordered in a sequence with one node being the primary node (also known as the leader or master node) and the others referred to as the backup nodes (also known as follower nodes). All of the nodes within the system communicate with each other, and the goal is for all honest nodes to come to an agreement/consensus on a state of the system.

For instance, for the PBFT consensus mechanism to work, the assumption is that the amount of non-functioning nodes in a blockchain system cannot simultaneously equal or exceed one third of the overall nodes in the system in a given window of vulnerability. The method effectively provides both liveness and safety as long as at most F nodes are non-functioning nodes at the same time. In other words, in some implementations, the number F of non-functioning nodes that can be tolerated by the PBFT consensus mechanism equals (N−1)/3, rounded down to the nearest integer, wherein N designates the total number of nodes in the system. In some implementations, a blockchain system implementing the PBFT consensus mechanism can handle up to F Byzantine faults where there are at least 3F+1 nodes in total.

The PBFT consensus mechanism may generally comprise a normal operation protocol (also known as the triple-stage protocol) and a view change protocol, wherein the normal operation protocol is provided for ensuring the safety of the mechanism, while the view change protocol is provided for ensuring the liveness of the mechanism. The normal operation protocol mainly includes three phases in order, i.e., a Pre-prepare phase, a Prepare phase, and a Commit phase. All phases are message-driven, i.e., a next phase in the protocol is triggered by obtaining a sufficient number of messages in a current phase.

During the normal operation protocol, the view change protocol may be triggered if the current primary node becomes non-functioning in order to elect a new primary node based on consensus. By replacing the current primary node, the normal operation protocol can be resumed to execute the functions of the system. However, for the view change protocol to trigger, the current primary node has to show "non-functioning" behaviors, such as abandoning transactions (when the PBFT consensus mechanism is used for verifying blockchain transactions), manipulating transactions, falsifying transactions, etc. These behaviors may be complicated and easy to overlook, when the system tries to compile them into a set of triggering rules. Moreover, the view change protocol also carries a high communication cost. To effectuate the current primary node replacement through view change, an amount of communication volume on a scale of $O(N^2)$ is required, where N blockchain nodes each need to send N messages (e.g., view change messages, new-view messages, etc.) to peer blockchain nodes. Further, multiple rounds of the view change protocol may need to be executed to change the current primary node, which causes instability and disruption to the normal function of the system. Therefore, it is desirable to provide an alternative solution to effectuate current primary node change without the complicated configuration and communication burden.

SUMMARY

Various embodiments of the specification include, but are not limited to, consensus systems, methods, and non-transitory computer readable media.

In some embodiments, a computer-implemented consensus method is to be implemented on a blockchain maintained by a number (N) of nodes, wherein one of the nodes acts as a primary node and the other (N−1) nodes act as backup nodes, and the method is performed by one of the N nodes. The method comprises: detecting a change in a current height H of the blockchain; determining the primary node based on a parameter P and the number of nodes N, wherein the parameter P is proportional to the current height H of the blockchain; in response to determining that the one of the N nodes is the primary node, executing a Practical Byzantine Fault Tolerance (PBFT) normal operation protocol as the primary node; and in response to determining that the one of the N nodes is not the primary node, executing the PBFT normal operation protocol as one of the backup nodes.

In some embodiments, the method further comprises: repeating the above steps of the computer-implemented consensus method for one or more rounds of the execution of the PBFT normal operation protocol; and for each of the one or more rounds, changing the primary node based on the parameter P and the number of nodes N.

In some embodiments, the current height H is based on a number of blocks in the blockchain; and the parameter P is identical among a plurality of the N nodes that respectively recognize the same current height H of the blockchain.

In some embodiments, each of the nodes is associated with an identification; and determining the primary node based on the parameter P and the number of nodes N comprises: determining one of the nodes that has an identification of (P mod N) to be the primary node.

In some embodiments, executing the PBFT normal operation protocol comprises: executing the PBFT normal operation protocol to add a new block to the blockchain.

In some embodiments, detecting the change in the current height H of the blockchain comprises: detecting that a number of blocks in the blockchain has increased by one.

In some embodiments, in response to determining that the one of the N nodes is the primary node, executing a PBFT normal operation protocol as the primary node comprises: multicasting a pre-prepare message to at least some of the backup nodes; obtaining (Q−1) or more prepare messages respectively from (Q−1) or more of the backup nodes, wherein the prepare messages each indicate an acceptance of the pre-prepare message by the corresponding backup node, Q (quorum) is (N+F+1)/2 rounded up to the nearest integer, and F is (N−1)/3 rounded down to the nearest integer; multicasting a commit message to at least some of the backup nodes, the commit message indicating that the primary node agrees to the (Q−1) or more prepare messages; and obtaining, respectively from Q or more nodes among the primary node and the backup nodes, Q or more commit messages each indicating that the corresponding node agrees to (Q−1) or more prepare messages received by the corresponding node.

In some embodiments, before multicasting the pre-prepare message to at least some of the backup nodes, the method further comprises obtaining one or more transaction requests from at least one of: one or more clients or one or more of the backup nodes; and after obtaining the Q or more commit messages, the method further comprises packing the one or more transactions into a new block to add to a local copy of the blockchain.

In some embodiments, the Q or more commit messages include the multicast commit message.

In some embodiments, in response to determining that the one of the N nodes is not the primary node, executing the PBFT normal operation protocol as one of the backup nodes comprises: obtaining a pre-prepare message from the primary node; multicasting a prepare message to at least some of the primary node and the other (N−2) backup nodes, the prepare message indicating an acceptance of the pre-prepare message; obtaining (Q−1) or more prepare messages respectively from (Q−1) or more of the backup nodes, wherein Q (quorum) is (N+F+1)/2 rounded up to the nearest integer, and F is (N−1)/3 rounded down to the nearest integer; multicasting a commit message to at least some of the primary node and the other backup nodes, the commit message indicating that the one backup node agrees to the (Q−1) or more prepare messages; and obtaining, respectively from Q or more nodes among the primary node and the backup nodes, Q or more commit messages each indicating that the corresponding node agrees to (Q−1) or more prepare messages received by the corresponding node.

In some embodiments, before obtaining the pre-prepare message from the primary node, the method further comprises obtaining one or more transaction requests from at least one of: one or more clients, the primary node, or one or more of the other backup nodes; and after obtaining the Q or more commit messages, the method further comprises packing the one or more transactions into a new block to add to a local copy of the blockchain.

In some embodiments, the (Q−1) or more prepare messages include the multicast prepare message; and the Q or more commit messages include the multicast commit message.

In some embodiments, a consensus system (e.g., acting as one of the N nodes for maintaining the blockchain) comprises one or more processors and one or more computer-readable memories coupled to the one or more processors and having instructions stored thereon that are executable by the one or more processors to perform the method of any of the preceding embodiments.

In some embodiments, a consensus apparatus (e.g., acting as one of the N nodes for maintaining the blockchain) comprises a plurality of modules for performing the method of any of the preceding embodiments.

In some embodiments, a non-transitory computer-readable medium having stored therein instructions that, when executed by a processor of a device, cause the device to perform the method of any of the preceding embodiments.

In some embodiments, a consensus system is for maintaining a blockchain, wherein a number (N) of nodes maintain the blockchain with one of the N nodes acting as a primary node and the other (N−1) nodes acting as backup nodes, the consensus system acting as one of the N nodes and comprising one or more processors and one or more non-transitory computer-readable memories coupled to the one or more processors and configured with instructions executable by the one or more processors to cause the system to perform operations comprising: detecting a change in a current height H of the blockchain; determining the primary node based on a parameter P and the number of nodes N, wherein the parameter P is proportional to the current height H of the blockchain; in response to determining that the one of the N nodes is the primary node, executing a PBFT normal operation protocol as the primary node; and in response to determining that the one of the N nodes is not the primary node, executing the PBFT normal operation protocol as one of the backup nodes.

According to yet another embodiment, a non-transitory computer-readable storage medium is for maintaining a blockchain, wherein a number (N) of nodes maintain the blockchain with one of the N nodes acting as a primary node and the other (N−1) nodes acting as backup nodes, the storage medium being associated with one of the N nodes and configured with instructions executable by one or more processors to cause the one or more processors to perform operations comprising: detecting a change in a current height H of the blockchain; determining the primary node based on a parameter P and the number of nodes N, wherein the parameter P is proportional to the current height H of the blockchain; in response to determining that the one of the N nodes is the primary node, executing a PBFT normal operation protocol as the primary node; and in response to determining that the one of the N nodes is not the primary node, executing the PBFT normal operation protocol as one of the backup nodes.

According to still another embodiment, a consensus apparatus is for maintaining a blockchain. A number (N) of nodes maintain the blockchain with one of the N nodes acting as a primary node and the other (N−1) nodes acting as backup nodes, the consensus apparatus acting as one of the N nodes and comprising: a detecting module for detecting a change in a current height H of the blockchain; a determining module for determining the primary node based on a parameter P and the number of nodes N, wherein the parameter P is proportional to the current height H of the blockchain; and an executing module for, in response to determining that the one of the N nodes is the primary node, executing a PBFT normal operation protocol as the primary node, and in response to determining that the one of the N nodes is not the primary node, executing the PBFT normal operation protocol as one of the backup nodes.

Embodiments disclosed in the specification have one or more technical effects. In some embodiments, the methods and systems can provide a pathway to change the primary node in addition and alternative to the view change protocol of PBFT. In one embodiment, each node of a blockchain system implementing PBFT with the disclosed improvements responds to an addition of a new block to the blockchain and elects to change the current primary node accordingly. Thus, the primary node designation is switched among the nodes of the system each time after the addition of the new block, which corresponds to an increase of the blockchain height. In some embodiments, such additional and alternative pathway at least mitigates the burden for configuring comprehensive conditions for triggering the view change protocol in the traditional PBFT, while achieving an even more thorough solution for ensuring the property function of the primary node. In some embodiments, such additional and alternative pathway obviates the communication burden required in the view change protocol to effectuate the change of the primary node. No additional messages needs to be transmitted among the nodes. In some embodiments, when applied in blockchain applications such as processing blockchain transactions, the system incorporating the disclosed methods can lower the operation cost and promote stability, efficiency, and accuracy of the blockchain operations. In one embodiment, such additional and alternative pathway can lead to active rotation of the primary node for each round of consensus verification with no additional cost nor operation disruption.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 5 illustrates a flow chart of a consensus method, in accordance with various embodiments.

DETAILED DESCRIPTION

Embodiments disclosed herein include, but are not limited to, consensus systems, methods, and non-transitory computer readable media for changing primary node. In various embodiments, a distributed network system such as a blockchain system may comprise a plurality of nodes. The blockchain system may implement a PBFT consensus mechanism, with one of the plurality of nodes designated as a primary node and the other nodes as backup nodes. According to some embodiments, each node may elect a new primary node in response to detecting a change of the blockchain height of a blockchain maintained by the nodes. For example, the blockchain height may increase when a new block is added to the blockchain. As such, the PBFT system incorporating the disclosed methods can effectuate primary node change without relying on the view change protocol, which leads to stability, efficiency, and accuracy of the blockchain operations without incurring communication costs. Similar to PBFT, the disclosed systems, methods, and non-transitory computer readable media can be applied to other consensus protocols such as SecureRing, Byzantine Paxos, Q/U, HQ, Zyzzvyva, ABsTRACTs, RBFT, Adapt, Tangaroa, CheapBFT, MinBFT, FastBFT, etc. Various aspects of PBFT can be referred to M. Castro, B. Liskov, "Practical Byzantine Fault Tolerance," Proceedings of the Third Symposium on Operating Systems Design and Implementation, (February 1999), which is incorporated by reference herein in its entirety.

Figure 1:
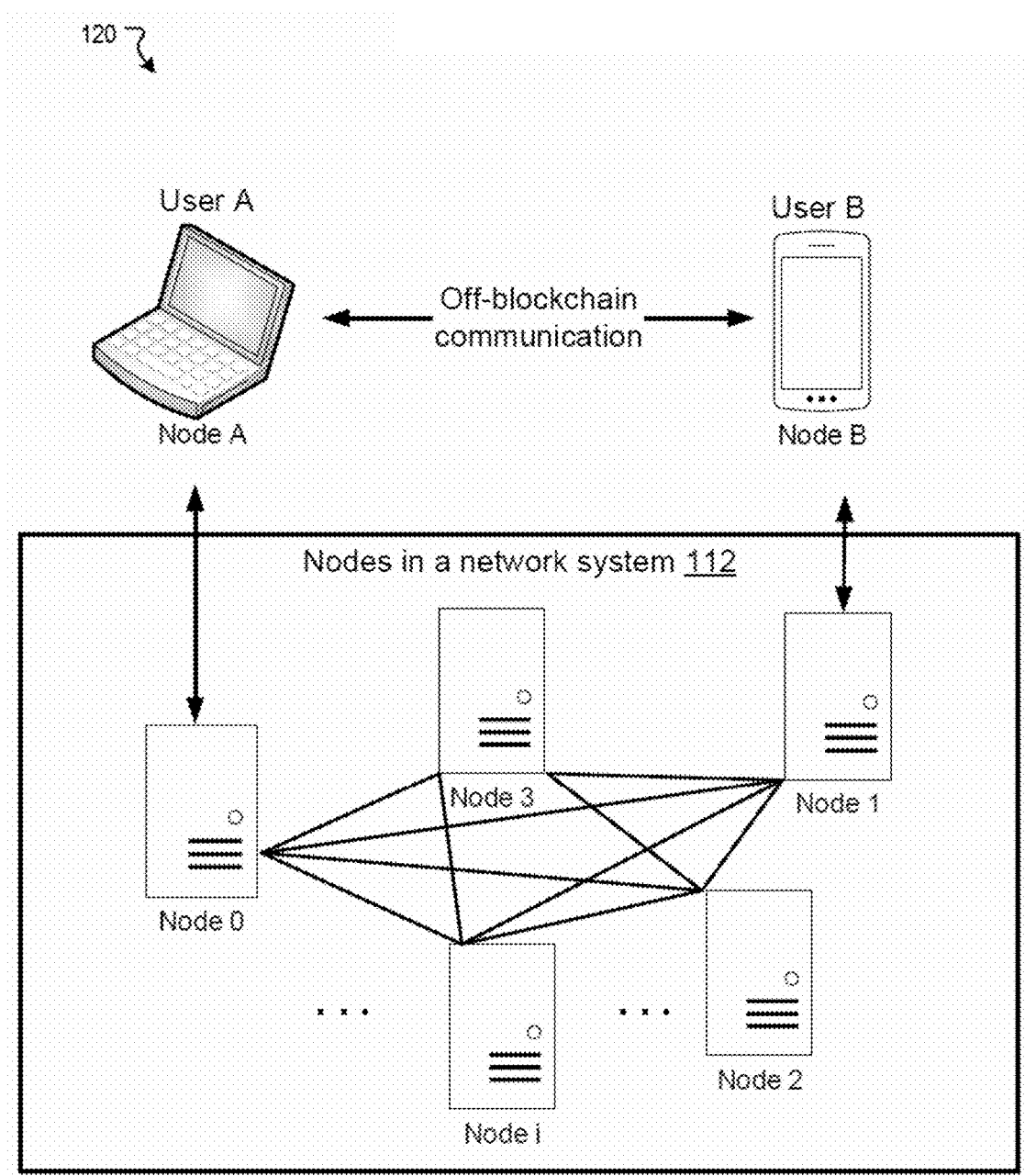
FIG. 1 illustrates a network, in accordance with various embodiments.

FIG. 1 shows a network 120, in accordance with various embodiments. The components presented below are intended to be illustrative. As shown, the network 120 may comprise a distributed network system 112 such as a blockchain system. The network system 112 may comprise one or more nodes (e.g., Node 0, Node 1, Node 2, Node 3, Node 4, . . . , Node i, . . . , etc.) implemented in one or more computing devices such as servers, computers, mobile phones, etc. The network system 112 may be installed with appropriate software (e.g., consensus program) and/or hardware (e.g., wires, wireless connections) to access other devices of the network 120 or additional systems. Each node may include one or more processors and one or more memories coupled to the one or more processors. For example, the one or more memories are non-transitory and computer-readable, and are configured with instructions executable by one or more processors to cause the one or more processors to perform operations described herein. Although the nodes are shown as single components in this figure, it can be appreciated that these nodes can be implemented as single devices or multiple devices coupled together. In general, nodes may be able to communicate with one another and other devices outside the network system 112. For example, through one or more wired or wireless networks (e.g., the Internet), data can be communicated.

In various embodiments, the network system 112 may be implemented as a blockchain system comprising a plurality of nodes. For example, as shown in FIG. 1, the blockchain system comprises a plurality of blockchain nodes (e.g., Node 0, Node 1, Node 2, Node 3, Node 4, . . . , Node i, . . . , etc.). The nodes may form a network (e.g., peer-to-peer network), with one blockchain node communicating with another. The order and the number of the blockchain nodes as shown are merely examples and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, the blockchain system may interact with other systems and devices such as node A and node B (e.g., lightweight nodes). The interactions may involve transmission and reception of data for the purpose of, for instance, receiving a request and return an execution result of the request. In one example, user A may want to transact with user B over the blockchain. The transaction may involve transferring some asset in user A's account to user B's account. User A and user B may use respective devices node A and node B installed with an appropriate blockchain software (e.g., cryptocurrency wallet) for the transaction. Node A may access the blockchain through communication with Node 0, and node B may access the blockchain through communication with Node 1. For example, Node A may submit a transaction request to the blockchain through Node 0, and Node B may submit a smart contract execution request to the blockchain through Node 1. Off the blockchain, Node A and Node B may have other channels of communication (e.g., regular internet communication without going through Nodes 0 and 1).

The blockchain nodes may each comprise or couple to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices such as nodes A and B operated by users.

The blockchain nodes form a network (e.g., P2P network) that, through consensus, records transactions in a distributed ledger known as blockchain. The participants of a P2P network may be referred to as nodes, which maintain the blockchain. In a blockchain P2P network, each node participates in consensus verifications and stores a complete ledger copy of the blockchain. Every node confirms batches of transactions by a blockchain consensus algorithm to ensure that all nodes have consistent confirmation results and thus consistent copies of the blockchain.

One of the blockchain consensus algorithms is Practical Byzantine Fault Tolerance (PBFT). Byzantine fault tolerance originates from the Byzantine general problem. For a P2P network system, as long as the number of non-functioning nodes is within a certain limit, the system can continue functioning properly. Such system is called Byzantine fault tolerant system. PBFT is an example of an optimization of the Byzantine Fault Tolerance network ability. PBFT provides the network with a Byzantine state machine, by copying servers and synchronizing client interactions with server copies.

At the center of the PBFT operation is the maintenance of the consistent global view of the information recorded on the blockchain, which forms the backbone for enabling users to interact with each other in a decentralized manner. The safety of the PBFT consensus mechanism is critical to a blockchain system. The two key properties of a consensus model are: 1) safety or consistency: all honest nodes produce the same valid output; and 2) liveness: all honest nodes in consensus eventually produce a value without being stalled at an intermediate step. A secure and robust PBFT consensus mechanism needs to tolerate a wide variety of Byzantine behaviors, including failures of nodes, partition of the network, message delay, out-of-order message delivery, message corruption, and the like and reach consensus in nodes as long as the number of non-functioning nodes within the system is limited. To that end, the PBFT model works under either one of two mutually exclusive protocols: normal operation/consistency protocol and view change protocol that are further described below. In this specification, non-functioning means faulty and/or malicious, and functioning means non-faulty and honest. Possible faulty and/or malicious acts may include: failure to delivery message, message delivery delay, out-of-order message delivery, Byzantine faults (delivering arbitrary messages to different nodes, violating the protocol), etc.

In some embodiments, a blockchain system implementing the Practical Byzantine Fault Tolerance (PBFT) mechanism may comprise a total number of N nodes, with one of the N nodes acting as a primary node and the other of the N nodes acting as backup nodes. The primary node designation may not be fixed to a particular node, as another node may be elected to become a new primary node through the view change protocol. For example, the primary node may be elected through a modulo operation, in which a functioning node with the lowest identification (modulo view number) becomes the new primary node. The current view and the total number of nodes N may determine the primary node to be the node with an identification of view mod N. In PBFT, the view is changed each time a new primary node is elected. For example, with each view change, the view increases monotonically from zero. That is, the view may change with a change in the primary node.

In some embodiments, the primary node is functioning at view v, and the normal operation protocol is executed. In the context of consensus-verifying blockchain transactions to add to the blockchain, for the normal operation, the primary node and/or the backup nodes may receive requests associated with unverified transactions from one or more clients. For example, Node A as a client may submit a request to the primary node and/or the backup nodes. The request may include an unverified transaction (e.g., a transaction to be added to a new block in blockchain by consensus verification). The unverified transactions may include, for example, blockchain-based financial transactions, smart contract deployment or execution transactions, etc. The primary and backup nodes may or may not perform some preliminary verification of the transactions. The backup nodes that receive the requests may forward the received requests to the primary node. Once the requests with unverified transactions at the primary node reach a certain level or otherwise meets a triggering condition, the primary node may initiate a round of consensus verification and propose a verification result for the unverified transactions. The backup nodes may respond to the consensus and confirm the proposal to reach a consensus. The requirements for the nodes are that they are deterministic and start in the same state. The final result is that all honest nodes come to a consensus on the order of the record and they either accept it or reject it. Once consensus-verified, the transactions may be packed into a new block of the blockchain and added to the local blockchain copies maintained by the nodes. Also, the clients (e.g., node A) that originally sent the requests are notified.

Figure 2A:
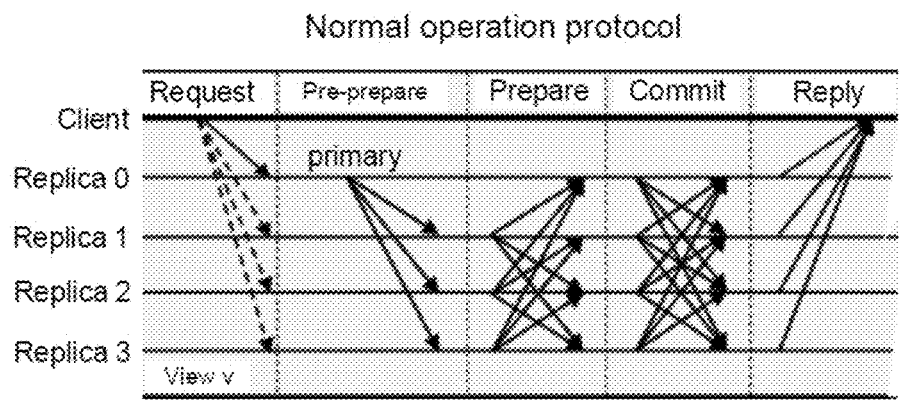
FIG. 2A illustrates a normal operation protocol of PBFT, in accordance with various embodiments.
Figure 2B:
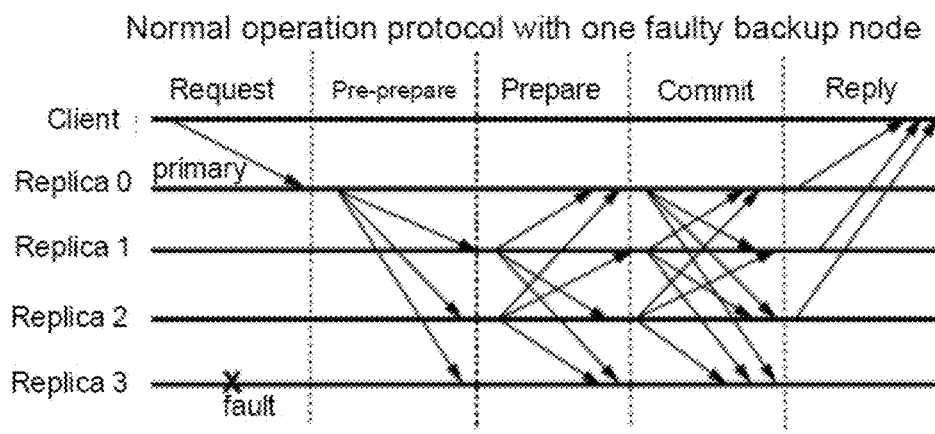
FIG. 2B illustrates a normal operation protocol of PBFT with one faulty replica, in accordance with various embodiments.
Figure 2C:
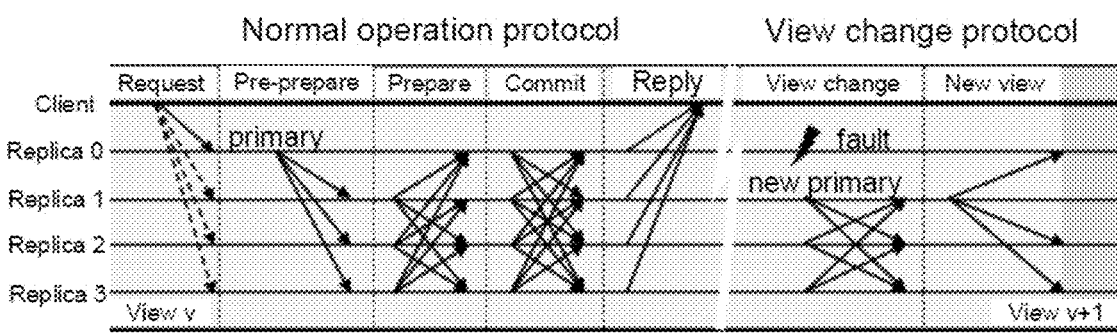
FIG. 2C illustrates a normal operation protocol and a view change protocol of PBFT, in accordance with various embodiments.

As indicated above, to preserve safety, the PBFT consensus mechanism mainly comprises three phases for the normal operation protocol: a Pre-prepare phase, a Prepare phase, and a Commit phase. Referring to FIG. 2A to FIG. 2C, an example of a blockchain system implementing the PBFT consensus mechanism comprises four replicas (replica being another term for node): Replica 0, Replica 1, Replica 2, and Replica 3. The numbers 0 to 3 are replica identifications. In the current view, Replica 0 may correspond to primary node 0, and Replicas 1, 2, and 3 may correspond to backup nodes 1, 2, and 3. The replicas may be implemented, for example, in corresponding nodes of the network system 112 described above. A normal operation protocol is shown in FIG. 2A with no non-functioning node present, and another normal operation protocol is shown in FIG. 2B with Replica 3 being a non-functioning node. For both situations, the normal operation protocol may further comprise two phases: a Request phase and a Reply phase, in addition to the Pre-prepare phase, the Prepare phase, and the Commit phase.

Figure 3A:
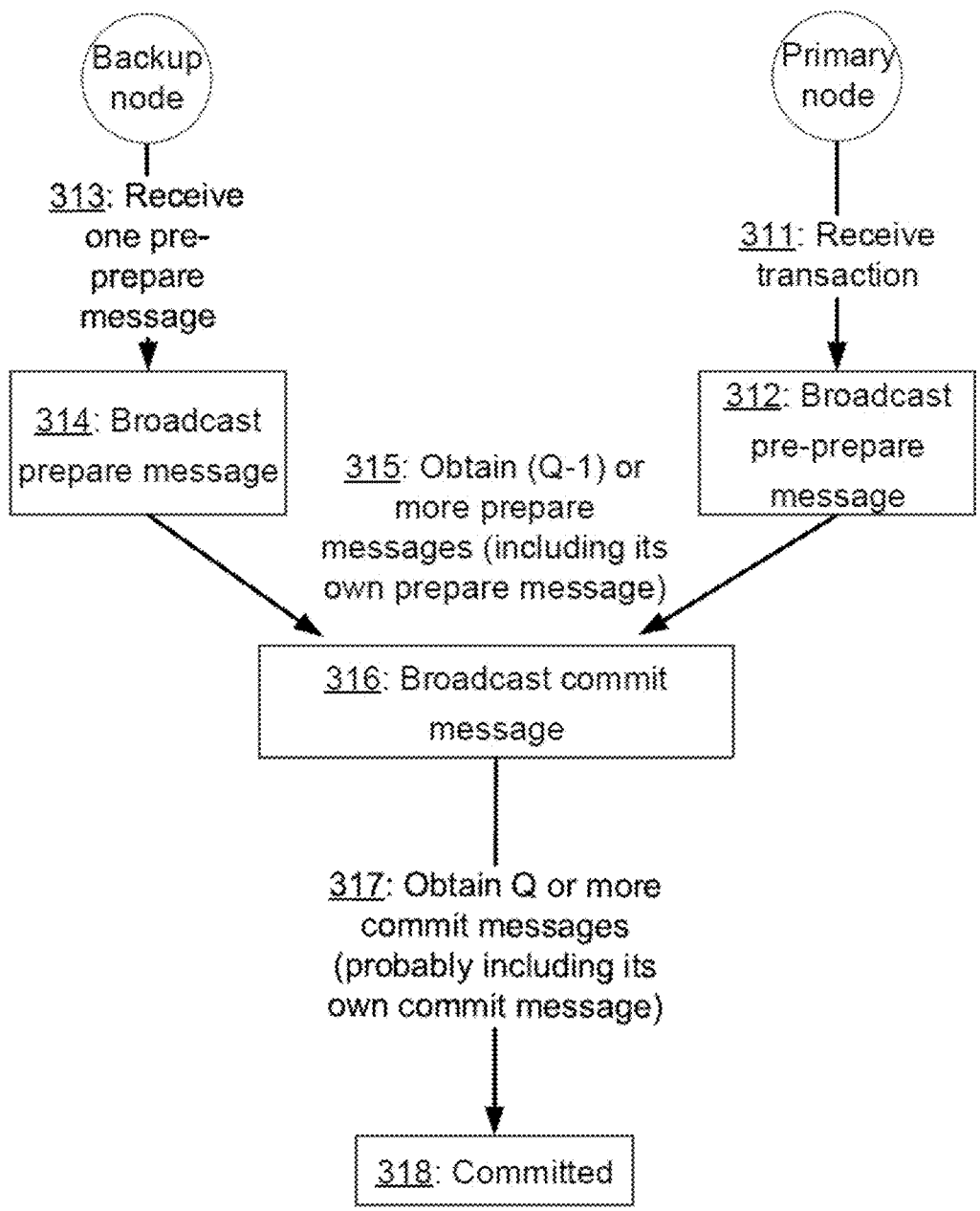
FIG. 3A illustrates a flow chart of steps of a normal operation protocol of PBFT, in accordance with various embodiments.

A flow chart of steps corresponding to FIG. 2A is shown in FIG. 3A. The steps shown in FIG. 3A (as well as FIG. 3B described below) may be applied to one round of consensus verification of one or more requests. For example, one round of consensus verification may process one or more transaction requests. The transaction requests may comprise requests to consensus-verify corresponding blockchain transactions to add to the blockchain. If the consensus-verification is successful, the corresponding transactions are packed into a new block of the blockchain by each node.

Referring to FIG. 2A, FIG. 2B, and FIG. 3A, the normal operation protocol begins in the Request phase when a client submits a request (message) to the primary node (Replica 0), which is responsible for advocating for the request. The request may comprise information of the client, a transaction request (e.g., one or more transactions for consensus verification), and a request timestamp. The client (also referred to as a client node) may be implemented, for example, in Node A described above. Node A may be a lightweight node (e.g., implemented in a mobile phone). Additionally or alternatively, the client may submit the request to a backup node, which forwards the request to the primary node before the Pre-prepare phase. Regardless whether the primary or backup node receives the request, the corresponding node may multicast the received request to the other nodes in the network. Thus, the primary node may end up obtaining the pending requests submitted by the clients to the consensus network one way or another (step 311).

Accordingly, the primary node acts like a leader and leads the backup nodes to verify the transaction/transactions associated with request. The primary node is responsible for ordering execution of requests within its view. In the Pre-prepare phase, the primary node may obtain a plurality of requests, validate the obtained requests, and propose a sequence number for each of the requests. Thus, the requests may each be assigned an increasing sequence number and thus put in order. Additionally, the pre-prepare message may comprise a blockchain height. The blockchain height may be based on a current height of the blockchain. For example, if the blockchain currently has 1000 blocks, the blockchain height may be 1000 indicating that 1000 blocks already exist in the blockchain. The primary node may forward a client's request along with the corresponding sequence number and/or the blockchain height. For example, after obtaining the requests, the primary node may arrange the requests in an order for executing the corresponding transactions by assigning the sequence numbers and store to a list. The primary node may send a pre-prepare message to every backup node (Replica 1 to Replica 3) in the blockchain system (step 312). As shown in FIG. 2A, the primary node may multicast the list in or along with the pre-prepare message to the backup nodes. As shown in FIG. 2B, even if a backup node (Replica 3) is non-functioning and the primary node is unaware of it, the primary node may still send the pre-prepare message (step 313). Each backup node accepts the pre-prepare message so long as it is valid. The pre-prepare message may contain a view number, a sequence number, a signature by the primary node, a digest (d), other meta data, and the like, which allow a determination of the validity of the pre-prepare message.

In the Prepare phase, if a backup node accepts the pre-prepare message, it may follow up by multicasting a prepare message to other nodes in the blockchain system including the primary node (step 314). Multicasting the prepare message indicates that the sender node agrees to the pre-prepare message. Each prepare message is accepted by the receiving node as long as being valid. The validity of the prepare message can be similarly determined based on the view number, the sequence number, the signature of the corresponding backup node, a digest (d), other meta data, and the like. A backup node is prepared, if it has received a valid pre-prepare message from the primary node, and has obtained (Q−1) or more distinct, valid, and consistent prepare messages from other nodes (step 315), wherein Quorum (Q) designates the number of replicas/nodes required to ensure all replica/node data consistency and fault tolerance requirements. In some embodiments, the blockchain system implementing the PBFT system has a number of at least 3F+1 replicas/nodes, wherein F designates the number of Byzantine faults/non-functioning nodes that the PBFT can tolerate to work with safety and liveness, and Quorum (Q) equals 2F+1. In this case, a pre-prepare message and at least 2F messages can be stored. The 2F prepare message may include the multicast prepare message. Here, Q−1 (in this case, 2F) instead of Q prepare messages are needed because the pre-prepare message can be treated as an equivalent of a prepare message of the primary node (although the primary node may not send the prepare message per se). If counting the pre-prepare message as one more prepare message, then there would be at least Q (e.g., 2F+1) distinct and valid prepare messages indicating that at least Q (e.g., 2F+1) of all nodes accepted the pre-prepare message, of which up to F non-functioning nodes can be tolerated. Thus, the pre-prepare to prepare phase ensures that at least F+1 functioning nodes (2F+1 prepared nodes but accounting for up to F non-functioning nodes) agree that if a request is executed in view v, it will be executed with its sequence number. The prepare phase ensures fault-tolerant consistent ordering of each request within views.

In some embodiments, after receiving the pre-prepare message and (Q−1) prepare messages, the backup node may verify the order and compare the verification result with a proposed verification result written by the primary node in the pre-prepare message. There may be a number of ways to verify the order. For example, the proposed verification result may comprise a proposed Merkle Patricia Trie root written into the digest (d). The backup node may arrange the transactions associated with the requests according to the order and compute a Merkle Patricia Trie root to compare with the proposed Merkle Patricia Trie root. The computation may also require certain existing information such as node hash of existing blocks in the blockchain. The comparison yields a digest (D(m)) calculated by the backup node. If the digest (D(m)) is consistent with the digest (d), the verification succeeds. Once verified, the backup node may agree to the ordering of the requests (e.g., the order for packing the transactions associated with the requests into a new block of the blockchain). Similarly, the backup node may verify if the commit messages (described below with respect to the commit phase) it receives comprise the same digest D(m) to determine if other nodes also agree to the ordering of the requests. If a prepared node has obtained Q (e.g., 2F+1) commit messages and all requests with lower sequence numbers have been executed, the node may execute the request.

In some embodiments, the pre-prepare message may comprise a digest (d) of the new block or information otherwise related to executing the requests (e.g., transactions associated with the requests). The digest (d) (e.g., a hash value) may be the numeric result of applying a hash algorithm to the data such as the transactions. The backup node may execute the transactions to confirm the digest (d). For a plurality of requests, the backup node may execute the requests according to the order (that is, the sequence numbers of the requests) to obtain a digest D(m). If D(m) and d are consistent, the backup node multicasts a commit message (described below with respect to the commit phase) which indicates that backup node agrees with the validation result of the primary node. For a pending request of a certain sequence number, if a prepared node has obtained Q (e.g., 2F+1) commit messages and all requests with lower sequence numbers have been executed, the node may execute the request.

In the Commit phase, if a node is prepared, it may execute the request. For example, the node may perform a part of the consensus-verification of an unverified blockchain transaction (the consensus will be realized at a later step 317 described below when a threshold number of nodes reach the same verification result). If the verification succeeds, the node may multicast a commit message to other nodes (step 316). The node may also receive commit messages from other nodes. Each node accepts the commit message so long as it is valid. The commit message may contain a view number, a sequence number, a signature, a digest, other meta data, and the like, which allow a determination of the validity of the message. In some embodiments, if a node has obtained at least Q distinct, valid, and consistent commit messages, it indicates that a quorum of nodes have committed (that is, at least (Q-F) honest nodes are prepared) and consensus has been reached (step 317). The at least Q valid commit messages may include the multicast commit message. Thus, the prepare to commit phase ensures that at least (Q-F) functioning nodes agree (Q commit messages but accounting for up to F non-functioning nodes) that a request will be eventually executed in view v with its sequence number. Since the nodes may commit in different views (e.g., when some nodes have already entered a new view and some other nodes remain in the previous view), the commit messages received may correspond to commits performed in different views. The commit phase ensures fault-tolerant consistent ordering of each request across views as functioning nodes agree on the sequence number of the each request.

In some embodiments, if a node has obtained at least Q distinct, valid, and consistent commit messages, the node may execute the corresponding request(s). For example, once Q commit messages have been obtained, it means that the new block is consensus-verified. Thus, the node may pack the new block into the locally maintained copy of blockchain. The original transaction request has been committed (step 318). Otherwise, the backup node may directly trigger the view change protocol.

In the reply phase, after the execution of the request(s), the node sends out a reply message directly to the client. For a transaction packed into the blockchain, the reply message may comprise an address of the transaction in the blockchain. Because up to F faults are allowed, the client waits for (Q-F) replies with valid signatures from different nodes and with the same request timestamp and the same result of execution before accepting the result. For the PBFT network system shown in FIG. 2A and FIG. 2B, there are four total nodes, so at most one (F=1) non-functioning node can be tolerated. Thus, even with Replica 3 being non-functioning, the consensus can still be reached in FIG. 2B.

To preserve liveness, the primary node can be replaced in a view change protocol if a specific amount of time has passed without the primary node multicasting the request. For example, the backup node may maintain a timer. The backup node starts the timer when it receives a request and the timer is not already running. The backup node stops the timer when it is no longer waiting to execute the request (i.e., the request is executed), but restarts the timer if at that point it is waiting to execute one or more other requests. If the timer expires, the backup node may determine that the primary node is non-functioning. Thus, the backup node may multicast a view change message to other nodes. For another example, the backup node may determine that the primary node is malicious. Thus, the backup node may multicast a view change message. For another example, the client may use a timer to determine if too much time has passed after client sends the request to the primary node without receiving a response. When this timer expires, the client sends its request to all nodes. If a node already knows about the request, the rebroadcast is ignored. If the node does not know about the request, it will start a timer. On timeout of the node's timer, the node starts the view change process by multicasting the view change message to other backup nodes based on the suspicion that the primary node is faulty (step 321). The view change message includes the system state (in the form of archived messages including the prepare message of its own during the previous normal operation), so that other nodes will know that the sender node has not failed.

Figure 3B:
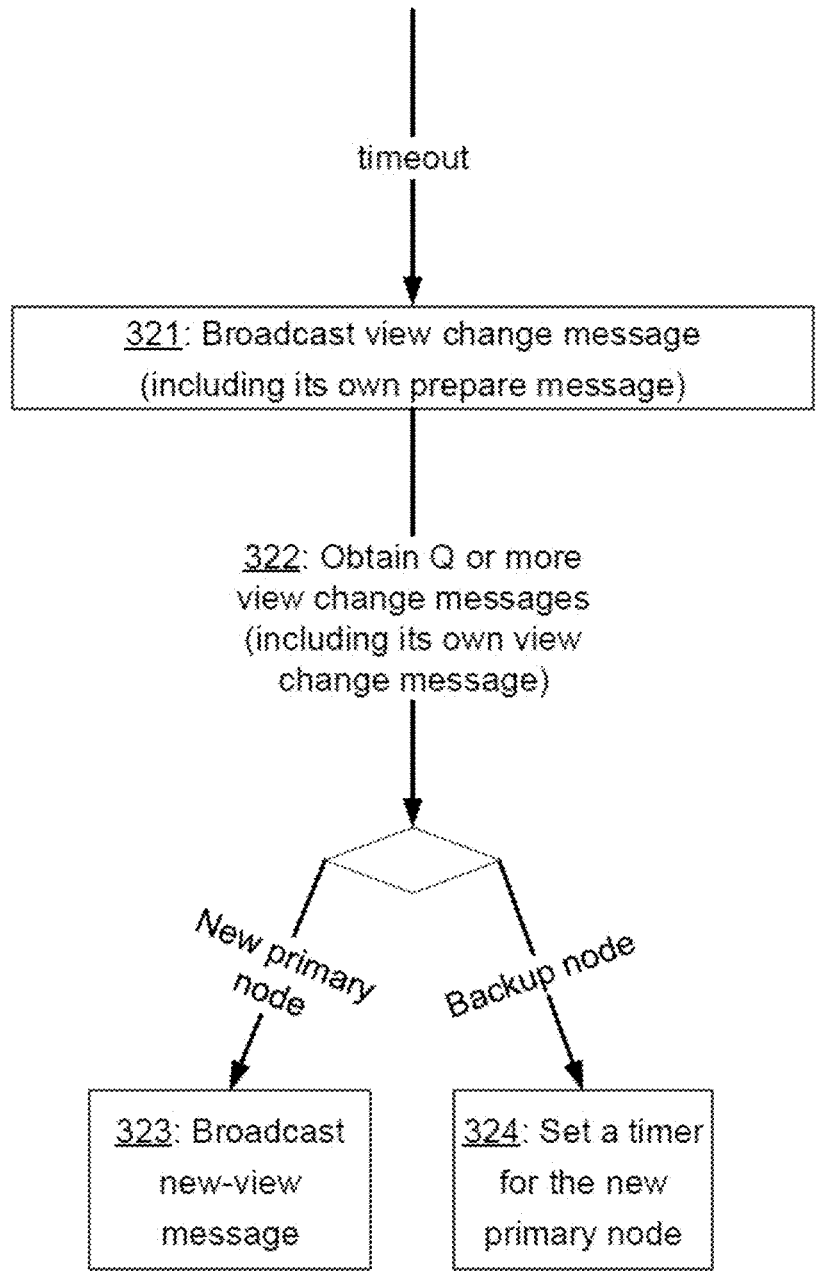
FIG. 3B illustrates a flow chart of steps of a view change protocol of PBFT.

A supermajority of functioning nodes can decide whether a primary node is non-functioning and remove it with the next primary node in line as the replacement. View change occurs when enough nodes believe that the primary node has failed. A portion of FIG. 2C shows the view change protocol, and a flow chart of steps corresponding to the view change protocol is shown in FIG. 3B. In FIG. 2C, from the request phase to the reply phase, since the current view is v, replica/node 0 is the primary node because p=(v mod N)=0. Referring to FIG. 2C and FIG. 3B, under the view change phase, if the current view is v+1, replica/node p=(v+1) mod N=1 waits for obtaining Q valid view change messages to become the new primary node, where p is the replica/node identification, v is the view number, N is the total number of replicas/nodes (step 322). That is, replica/node 1 becomes the new primary node. The Q view change messages may include the multicast view change message. Since the previous view is v, the view change messages may each comprise a new view v+1. Once new primary node p has obtained Q view change messages, it multicasts a new view message (step 323). This message contains all the valid view change messages received as well as a set of all requests that may not have been completed yet due to primary node failure. The new primary node may decide on the latest checkpoint and ensure, among other things, that non-faulty nodes are caught up with the latest states, which may involve re-committing previous requests (e.g., prepared, committed, but not executed requests) in the new view. While the view change is occurring, no new requests are accepted. After a node receives a valid new view message including the Q view change messages, it enters view v+1 and processes the set of uncompleted requests. Thereafter, the normal operation protocol proceeds, and the nodes redo the requests between the sequence number of the latest stable checkpoint and the highest number in a prepare message, but avoid re-executing requests. The backup nodes may set a timer for the new primary node (step 324).

Figure 4:
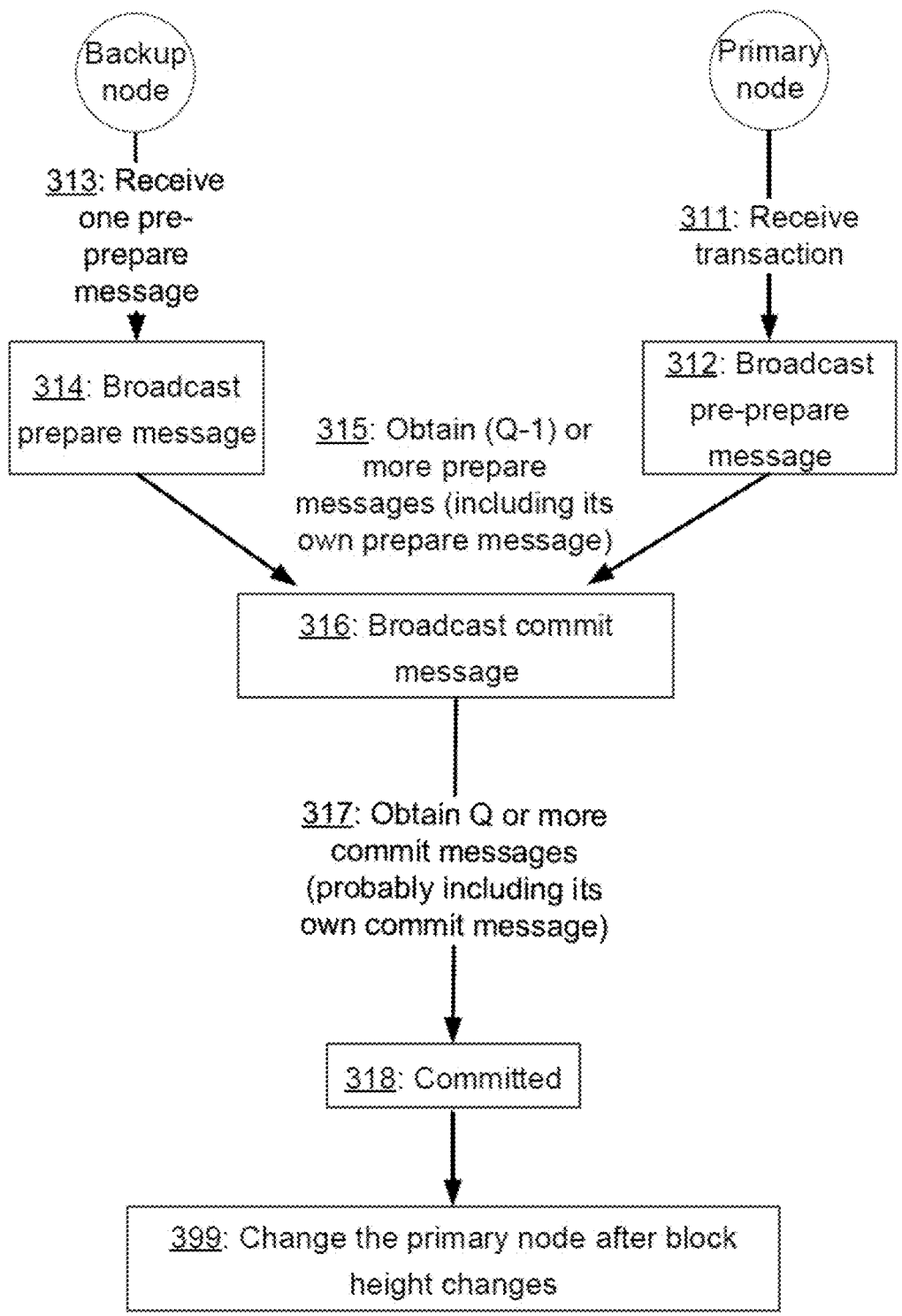
FIG. 4 illustrates a flow chart of steps of a normal operation protocol of a consensus system, in accordance with various embodiments.

FIG. 4 is similar to the normal operation protocol shown in FIG. 3A, except for the addition of a primary node change step 399. In some embodiments in the context of blockchain transactions, by committing at step 318, the node adds the consensus-verified transaction/transactions in a new block to the blockchain. The node may make the addition in its local copy of the blockchain according to the consensus reached among the nodes, such that its local copy is consistent with the consensus version of the blockchain recognized by the system. The new block will link to the previously last block of the blockchain, increasing the total number of blocks of the blockchain by one. Thus, the blockchain height increases by one. At step 399, the node may change the primary node as viewed by itself based on the blockchain height. If the node itself was a primary node performing the steps 313-318, the node may become a backup node at step 399. If the node itself was a backup node performing the steps 311, 312, and 315-318, the node may become a primary node or remain as a backup node at step 399. After step 399, the node may go back to perform step 313 or 311 depending on whether it has become a backup or primary node. Then, the other steps in FIG. 4 are repeated for another round of consensus verification. Further details are described below with reference to FIG. 5.

FIG. 5 illustrates a flowchart of a consensus method 510, according to various embodiments of this specification. The method 510 may be implemented by one or more components of the system 112 of FIG. 1 (e.g., Node 0, Node 1, Node 2, . . . , or Node i described above or a similar device, or a combination of any of the nodes and one or more additional devices (e.g., Node A)). The method 510 may be implemented by one or more blockchain nodes (e.g., a backup node). The method 510 may be implemented by a consensus system or device (e.g., computer, server) comprising various hardware machine and/or software. For example, the consensus system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, method 510 may include additional, fewer, or alternative steps performed in various orders or in parallel. Further details of the method 510 can also be referred to FIG. 1 to FIG. 4 and related descriptions above.

In some embodiments, the method 510 may be implemented on a blockchain maintained by a number (N) of nodes, of which one of the nodes acts as a primary node and the other (N−1) nodes act as backup nodes, and the method 510 is performed by one of the N nodes. N can be any integer no less than four. In some embodiments, N equals 3F+1, wherein F designates the number of non-functioning nodes that the system can tolerate in the PBFT consensus mechanism. The primary and backup nodes may be those defined in the PBFT consensus mechanism. The method 510 may be applied to one or more rounds of consensus verification for one or more requests (e.g., blockchain transaction requests). The steps of the method 510 may be performed by a primary or backup node in a current view.

Block 511 includes detecting a change in a current height H of the blockchain. In some embodiments, the current height H is based on a number of blocks in the blockchain. For example, if the blockchain currently has 2000 blocks, the current height H may be 2000 (if counting from block 1, block 2, . . . block 2000). In one embodiment, the blockchain height may refer to a block height of the latest block, which is the sequence number of the latest block in the chain of blocks. For example, if the last block in the blockchain is the $2000^{th}$ block, the block height of the latest block may be 2000. Although the examples of blockchain height and block height shown here start from block 1, it can be appreciated that the first block can start from any sequence number. In some embodiments, detecting the change in the current height H of the blockchain comprises detecting that a number of blocks in the blockchain has increased by one. The increase of H may indicate the completion of one round of consensus verification. The next round of consensus verification may not start until a new block has been added to the blockchain as indicated by the increase in H.

Block 512 includes determining the primary node based on a parameter P and the number of nodes N, wherein the parameter P is proportional to the current height H of the blockchain. In some embodiments, the parameter P is identical among a plurality of the N nodes that respectively recognize the same current height H of the blockchain. For example, P may be based on H and one or more constants such as 2H, 3H+1, etc. For another example, P may be a type of random number generated based on H, such that P is identical for the same H. For another example, each node may recognize the current height of the local copy of the blockchain as H. P can be any parameter that is identical for the nodes that respectively recognize the same current height H.

Block 513 includes in response to determining that the one of the N nodes is the primary node, executing a Practical Byzantine Fault Tolerance (PBFT) normal operation protocol as the primary node. Block 514 includes in response to determining that the one of the N nodes is not the primary node, executing the PBFT normal operation protocol as one of the backup nodes. In some embodiments, each of the nodes is associated with an identification; and determining the primary node based on the parameter P and the number of nodes N comprises: determining one of the nodes that has an identification of (P mod N) to be the primary node. For example, if the system comprises four nodes (N=4) including node 0, node 1, node 2, and node 4, and if P=H=2000, then node 0 is the primary node, because (2000 mod 4) is 0. If then a new block is added to the blockchain making H=2001, node 1 becomes the primary node because (2001 mod 4) is 1. Thus, for steps 513 and 514, the node performing the method 510 may determine if it has become a primary node or backup node and execute corresponding protocols. Executing the PBFT normal operation protocol may comprise executing the PBFT normal operation protocol to add a new block to the blockchain, for example, through the consensus verification described above.

Optional block 515 includes repeating the steps 511-514 for one or more rounds of the execution of the PBFT normal operation protocol; and for each of the one or more rounds, changing the primary node based on the parameter P and the number of nodes N. In some embodiments, for each round of consensus verification, the primary node and the backup nodes may each perform steps 511-514. After the blockchain height has increased by one, each node will check its status (primary or backup) for performing the next round of consensus verification, and the cycle repeats.

In some embodiments, in response to determining that the one of the N nodes is not the primary node, executing the PBFT normal operation protocol as one of the backup nodes comprises: obtaining a pre-prepare message from the primary node; multicasting a prepare message to at least some of the primary node and the other (N−2) backup nodes, the prepare message indicating an acceptance of the pre-prepare message; obtaining (Q−1) or more prepare messages respectively from (Q−1) or more of the backup nodes, wherein Q (quorum) is (N+F+1)/2 rounded up to the nearest integer, and F is (N−1)/3 rounded down to the nearest integer; multicasting a commit message to at least some of the primary node and the other backup nodes, the commit message indicating that the one backup node agrees to the (Q−1) or more prepare messages; and obtaining, respectively from Q or more nodes among the primary node and the backup nodes, Q or more commit messages each indicating that the corresponding node agrees to (Q−1) or more prepare messages received by the corresponding node. Multicast means broadcast to one or more or all of the other nodes in the PBFT system. Each functioning backup node may multicast the prepare message. The (Q−1) prepare messages may be from distinct nodes and are valid and consistent, which indicates that at least (Q−1) backup nodes and the primary node agree to the pre-prepare message.

In some embodiments, the commit message indicates that the corresponding node that multicast the commit message agrees to the pre-prepare message and has obtained (Q−1) or more prepare messages. The Q commit messages may be from distinct nodes and are valid and consistent, which indicates that Q nodes are prepared to execute the requests in the order. Thus, a consensus is reached by a majority of the nodes. In some embodiments, the commit message indicates that the one backup node agrees to the pre-prepare message and has obtained the (Q−1) or more prepare messages. In one embodiment, the (Q−1) or more prepare messages include the multicast prepare message; and the Q or more commit messages include the multicast commit message. In some embodiments, verification steps may be performed for agreeing to multicast the commit message. For example, as described above, digest D(m) may be determined according to the order to verify against digest d. If consistent, the commit message may be multicast.

In some embodiments, before obtaining the pre-prepare message from the primary node, the method further comprises obtaining one or more transaction requests from at least one of: one or more clients, the primary node, or one or more of the other backup nodes. The transaction in the term "transaction request" may be implemented via a blockchain system and recorded in the blockchain. The transaction may include, for example, a financial transaction, a blockchain contract transaction for deploying or invoking a blockchain contract, a transaction that updates a state (e.g., world state) of the blockchain, etc. The transaction does not have to involve a financial exchange. The transaction requests may comprise blockchain transactions to be added to the blockchain via consensus verification. In one embodiment, the pre-prepare message comprises an order of one or more transactions (e.g., blockchain transactions) corresponding to the one or more transaction requests. The order may be proposed by the primary node which multicast the pre-prepare message for executing the transaction requests. The order may correspond to a unique hash value identification of a proposed new block containing the transactions. The primary node and the backup nodes will verify the proposed order and try to reach a consensus. Alternatively, the request may comprise another instruction to one or more computing devices to provide information or perform another function.

In some embodiments, after obtaining the Q or more commit messages, the method further comprises packing the one or more transactions into a new block to add to a local copy of the blockchain. For example, the requests may be consensus-verified as at least (Q−F) honest nodes (Q commit messages but accounting for at most F non-functioning nodes) have verified the digest d in their commit messages (or for the primary node, it may not have to perform the verification since it proposed the digest d). As a result, if enough nodes have verified the corresponding transactions, the transactions can be packed into the blockchain. The client(s) (e.g., node A) that originally sent the request(s) may be notified.

In some embodiments, in response to determining that the one of the N nodes is the primary node, executing a PBFT normal operation protocol as the primary node comprises: multicasting a pre-prepare message to at least some of the backup nodes; obtaining (Q−1) or more prepare messages respectively from (Q−1) or more of the backup nodes, wherein the prepare messages each indicate an acceptance of the pre-prepare message by the corresponding backup node, Q (quorum) is (N+F+1)/2 rounded up to the nearest integer, and F is (N−1)/3 rounded down to the nearest integer; multicasting a commit message to at least some of the backup nodes, the commit message indicating that the primary node agrees to the (Q−1) or more prepare messages; and obtaining, respectively from Q or more nodes among the primary node and the backup nodes, Q or more commit messages each indicating that the corresponding node agrees to (Q−1) or more prepare messages received by the corresponding node. In one embodiment, the Q or more commit messages include the multicast commit message. In some embodiments, F represents a maximum number of non-functioning nodes allowed among the N nodes to keep a consensus system of the N nodes functioning. The (Q−1) or more prepare messages may be from distinct nodes and are valid and consistent, which indicates that (Q−1) or more backup nodes and the primary node agree to the pre-prepare message.

In some embodiments, the commit message indicates that the primary node has obtained the (Q−1) or more prepare messages. In some embodiments, the commit message indicates that the corresponding node that multicast the commit message agrees to the pre-prepare message and has obtained (Q−1) or more prepare messages. The Q or more commit messages may be from distinct nodes and are valid and consistent, which indicates that Q or more nodes are prepared to execute the requests in the order. Thus, a consensus is reached by a majority of the nodes, and the next execution step can be performed.

In some embodiments, before multicasting the pre-prepare message to at least some of the backup nodes, the method further comprises obtaining one or more transaction requests from at least one of: one or more clients or one or more of the backup nodes; and after obtaining the Q or more commit messages, the method further comprises packing the one or more transactions into a new block to add to a local copy of the blockchain.

In some embodiments, the method 510 may provide an additional pathway to change the primary node, and not to replace the view change protocol. That is, the method 510 or the view change protocol may trigger the primary node change. The method 510 may provide a chance for changing the primary node after each round of consensus verification succeeds in increasing the blockchain height, while the view change protocol may provide a chance for changing the primary node when the primary node is non-functioning. Combining them together, in one embodiments, the node with an identification of ((P+v) mod N) may be elected the primary node.

Figure 6:
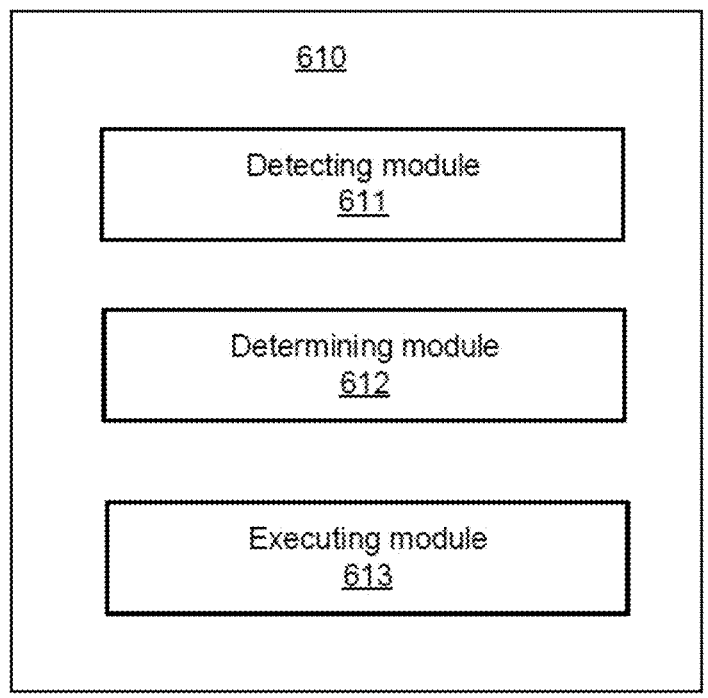
FIG. 6 illustrates a block diagram of a consensus system, in accordance with various embodiments.

FIG. 6 illustrates a block diagram of a consensus system 610, in accordance with various embodiments. The consensus system 610 (e.g., a computer system) may be an example of implementation of Node 0, Node 1, Node 2, . . . , or Node i described above or a similar device, or a combination of any of the nodes and an additional device (e.g., Node A). The method 510 may be implemented by the consensus system 610. The consensus system 610 may comprise one or more processors and one or more non-transitory computer-readable storage media (e.g., one or more memories) coupled to the one or more processors and configured with instructions executable by the one or more processors to cause the system or device (e.g., the processor) to perform the method 510. The consensus system 610 may be implemented in a primary or backup node. The consensus system 610 may comprise various units/modules corresponding to the instructions (e.g., software instructions).

In some embodiments, the consensus system 610 may be referred to as a consensus apparatus. The consensus apparatus may be for maintaining a blockchain, wherein a number (N) of nodes maintain the blockchain with one of the N nodes acting as a primary node and the other (N−1) nodes acting as backup nodes, the consensus apparatus acting as one of the N nodes and comprising one or more processors and one or more non-transitory computer-readable memories coupled to the one or more processors and configured with instructions executable by the one or more processors to cause the apparatus to perform operations. The consensus apparatus may comprise various units/modules corresponding to the instructions (e.g., software instructions). The consensus apparatus may comprise a detecting module 611 for detecting a change in a current height H of the blockchain; a determining module 612 for determining the primary node based on a parameter P and the number of nodes N, wherein the parameter P is proportional to the current height H of the blockchain; and an executing module 613 for, in response to determining that the one of the N nodes is the primary node, executing a PBFT normal operation protocol as the primary node, and in response to determining that the one of the N nodes is not the primary node, executing the PBFT normal operation protocol as one of the backup nodes.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof. For example, the virtual machine may include an Ethereum Virtual Machine (EVM) software that provides the runtime environment for smart contracts in Ethereum.

Figure 7:
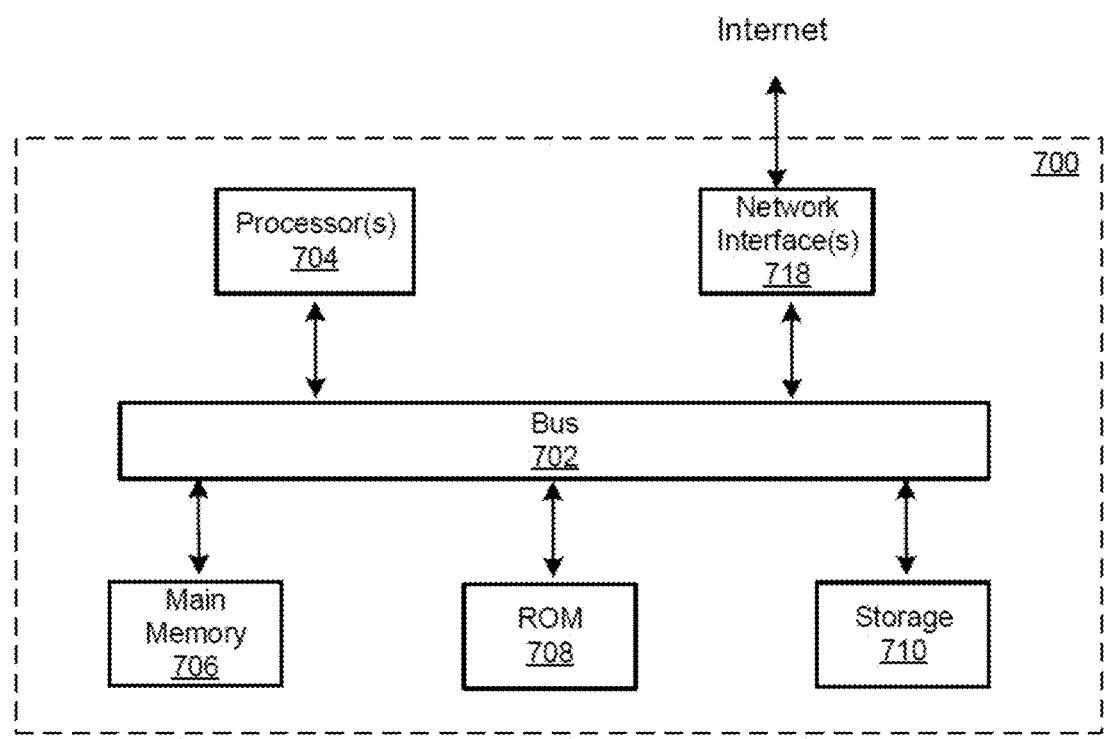
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the consensus method 510). The system 700 may be implemented in any of the systems described herein (e.g., the consensus system 610). The system 700 may be implemented in any of the nodes described herein and configured to perform corresponding steps for implementing blockchain contract. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media exclude transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented consensus method to be implemented on a blockchain maintained by a number (N) of nodes, wherein each of the nodes is associated with an identification, one of the nodes is designated and acts as a primary node and the other (N−1) nodes act as backup nodes, and the method is performed by one of the N nodes, the method comprising:
   detecting a change in a current height H of the blockchain;
   determining the primary node based on a parameter P and the number of nodes N determining one of the nodes that has an identification of (P mod N) to be the primary node, wherein the parameter P is proportional to the current height H of the blockchain;

in response to determining that the one of the N nodes is the primary node, executing a Practical Byzantine Fault Tolerance (PBFT) normal operation protocol as the primary node; and in response to determining that the one of the N nodes is not the primary node, executing the PBFT normal operation protocol as one of the backup nodes; and wherein the designation of the primary node among the N nodes is determined without executing a PBFT view change protocol.

2. The method of claim 1, wherein:
the current height H is based on a number of blocks in the blockchain; and
the parameter P is identical among a plurality of the N nodes that respectively recognize the same current height H of the blockchain.

3. The method of claim 1, wherein executing the PBFT normal operation protocol comprises:
executing the PBFT normal operation protocol to add a new block to the blockchain.

4. The method of claim 1, further comprising:
repeating the steps of claim 1 for one or more rounds of the execution of the PBFT normal operation protocol; and
for each of the one or more rounds, changing the primary node based on the parameter P and the number of nodes N.

5. The method of claim 1, wherein detecting the change in the current height H of the blockchain comprises:
detecting that a number of blocks in the blockchain has increased by one.

6. The method of claim 1, wherein in response to determining that the one of the N nodes is the primary node, executing a PBFT normal operation protocol as the primary node comprises:
multicasting a pre-prepare message to at least some of the backup nodes;
obtaining (Q−1) or more prepare messages respectively from (Q−1) or more of the backup nodes, wherein the prepare messages each indicate an acceptance of the pre-prepare message by the corresponding backup node, Q (quorum) is (N+F+1)/2 rounded up to the nearest integer, and F is (N−1)/3 rounded down to the nearest integer;
multicasting a commit message to at least some of the backup nodes, the commit message indicating that the primary node agrees to the (Q−1) or more prepare messages; and
obtaining, respectively from Q or more nodes among the primary node and the backup nodes, Q or more commit messages each indicating that the corresponding node agrees to (Q−1) or more prepare messages received by the corresponding node.

7. The method of claim 6, wherein:
before multicasting the pre-prepare message to at least some of the backup nodes, the method further comprises obtaining one or more transaction requests from at least one of: one or more clients or one or more of the backup nodes; and
after obtaining the Q or more commit messages, the method further comprises packing the one or more transactions into a new block to add to a local copy of the blockchain.

8. The method of claim 6, wherein:
the Q or more commit messages include the multicast commit message.

9. The method of claim 1, wherein in response to determining that the one of the N nodes is not the primary node, executing the PBFT normal operation protocol as one of the backup nodes comprises:
obtaining a pre-prepare message from the primary node;
multicasting a prepare message to at least some of the primary node and the other (N−2) backup nodes, the prepare message indicating an acceptance of the pre-prepare message;
obtaining (Q−1) or more prepare messages respectively from (Q−1) or more of the backup nodes, wherein Q (quorum) is (N+F+1)/2 rounded up to the nearest integer, and F is (N−1)/3 rounded down to the nearest integer;
multicasting a commit message to at least some of the primary node and the other backup nodes, the commit message indicating that the one backup node agrees to the (Q−1) or more prepare messages; and
obtaining, respectively from Q or more nodes among the primary node and the backup nodes, Q or more commit messages each indicating that the corresponding node agrees to (Q−1) or more prepare messages received by the corresponding node.

10. The method of claim 9, wherein:
before obtaining the pre-prepare message from the primary node, the method further comprises obtaining one or more transaction requests from at least one of: one or more clients, the primary node, or one or more of the other backup nodes; and
after obtaining the Q or more commit messages, the method further comprises packing the one or more transactions into a new block to add to a local copy of the blockchain.

11. The method of claim 9, wherein:
the (Q−1) or more prepare messages include the multicast prepare message; and
the Q or more commit messages include the multicast commit message.

12. A non-transitory computer-readable storage medium for performing consensus in a blockchain maintained by a number (N) of nodes, wherein each of the nodes is associated with an identification, one of the nodes is designated and acts as a primary node and the other (N−1) nodes act as backup nodes, the storage medium is implemented in one of the N nodes, and the storage medium is configured with instructions executable by one or more processors to cause the one or more processors to perform operations comprising:
detecting a change in a current height H of the blockchain;
determining the primary node based on a parameter P and the number of nodes N by determining one of the nodes that has an identification of (P mod N) to be the primary node, wherein the parameter P is proportional to the current height H of the blockchain;
in response to determining that the one of the N nodes is the primary node, executing a Practical Byzantine Fault Tolerance (PBFT) normal operation protocol as the primary node; and
in response to determining that the one of the N nodes is not the primary node, executing the PBFT normal operation protocol as one of the backup nodes; and
wherein the designation of the primary node among the N nodes is determined without executing a PBFT view change protocol.

13. The storage medium of claim 12, wherein:
the current height H is based on a number of blocks in the blockchain; and
the parameter P is identical among a plurality of the N nodes that respectively recognize the same current height H of the blockchain.

14. The storage medium of claim 12, wherein detecting the change in the current height H of the blockchain comprises:
detecting that a number of blocks in the blockchain has increased by one.

15. A system for performing consensus in a blockchain maintained by a number (N) of nodes, wherein each of the nodes is associated with an identification, one of the nodes is designated and acts as a primary node and the other (N−1) nodes act as backup nodes, the system is implemented in one of the N nodes, the system comprising one or more processors and one or more computer-readable memories coupled to the one or more processors and having instructions stored thereon that are executable by the one or more processors to perform operations comprising:
detecting a change in a current height H of the blockchain;
determining the primary node based on a parameter P and the number of nodes N by determining one of the nodes that has an identification of (P mod N) to be the primary node, wherein the parameter P is proportional to the current height H of the blockchain;
in response to determining that the one of the N nodes is the primary node, executing a Practical Byzantine Fault Tolerance (PBFT) normal operation protocol as the primary node; and
in response to determining that the one of the N nodes is not the primary node, executing the PBFT normal operation protocol as one of the backup nodes; and
wherein the designation of the primary node among the N nodes is determined without executing a PBFT view change protocol.

16. The system of claim 15, wherein:
the current height H is based on a number of blocks in the blockchain; and
the parameter P is identical among a plurality of the N nodes that respectively recognize the same current height H of the blockchain.

17. The system of claim 15, wherein detecting the change in the current height H of the blockchain comprises:
detecting that a number of blocks in the blockchain has increased by one.

* * * * *

UNITED STATES PATENT AND TRADEMARK OFFICE
CERTIFICATE OF CORRECTION

PATENT NO. : 10,671,599 B2
APPLICATION NO. : 16/716932
DATED : June 2, 2020
INVENTOR(S) : Dayi Yang It is certified that error appears in the above-identified patent and that said Letters Patent is hereby corrected as shown below:

In the Claims

Claim 1, Column 20, Line 66:
"the number of nodes N determining one of the nodes" should read -- the number of nodes N by determining one of the nodes --.

Signed and Sealed this
Fifth Day of September, 2023

Katherine Kelly Vidal
*Director of the United States Patent and Trademark Office*